April 5, 1960  J. THELANDER ET AL  2,931,325
SOWING IMPLEMENT
Filed July 24, 1956  4 Sheets-Sheet 1
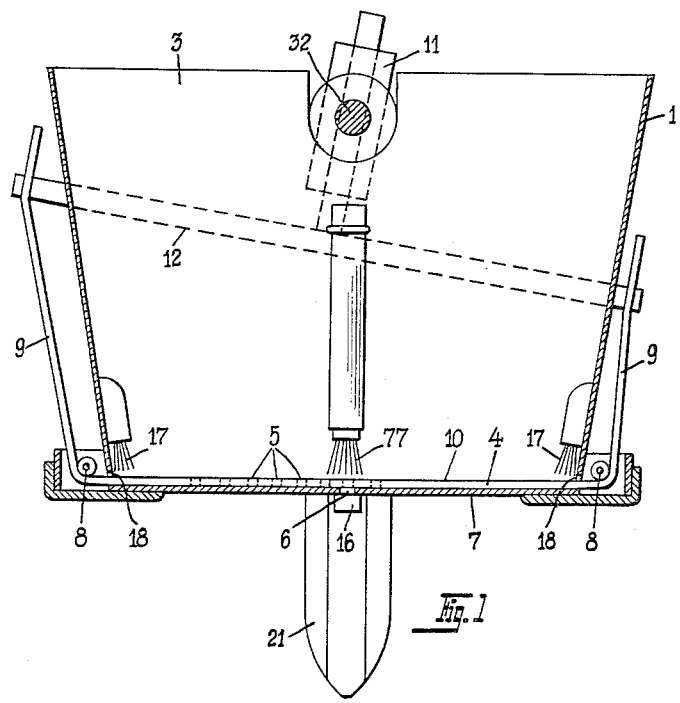
INVENTORS
John Thelander
Gunnar Leijon
Erving Westergren
Sven Åkesson
by Sommers & Young, Attorneys

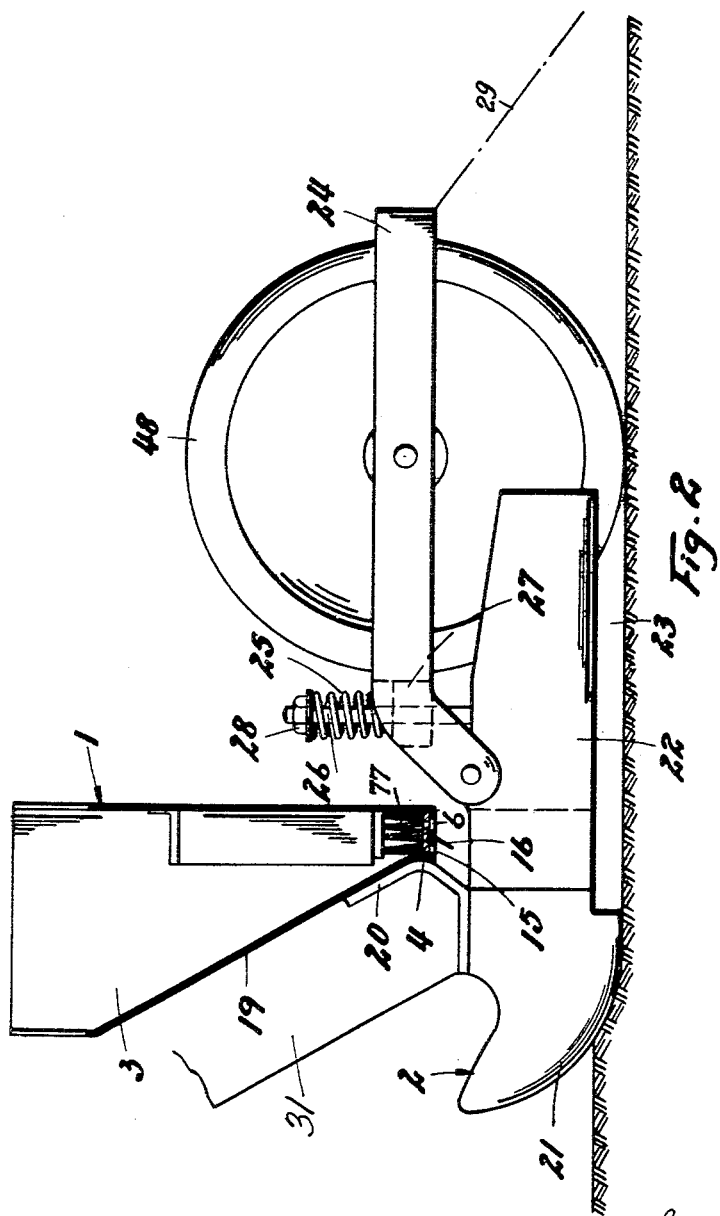

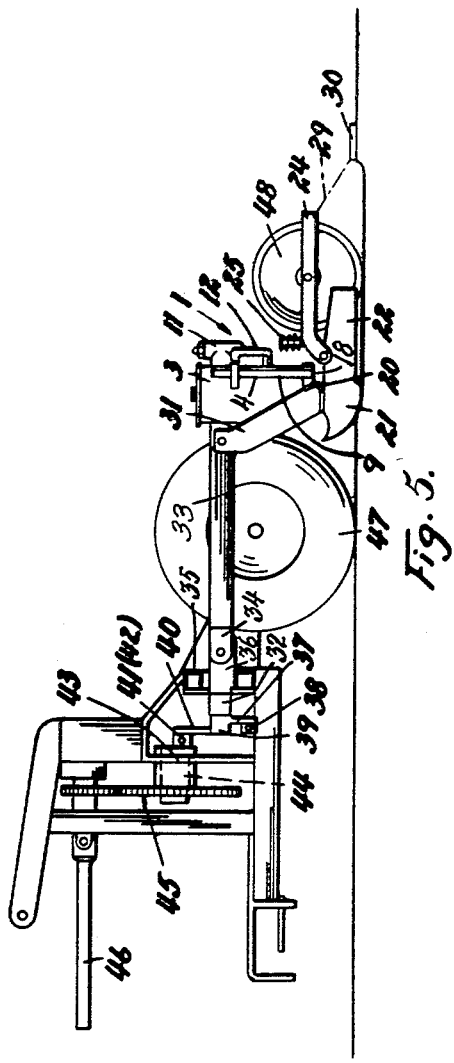

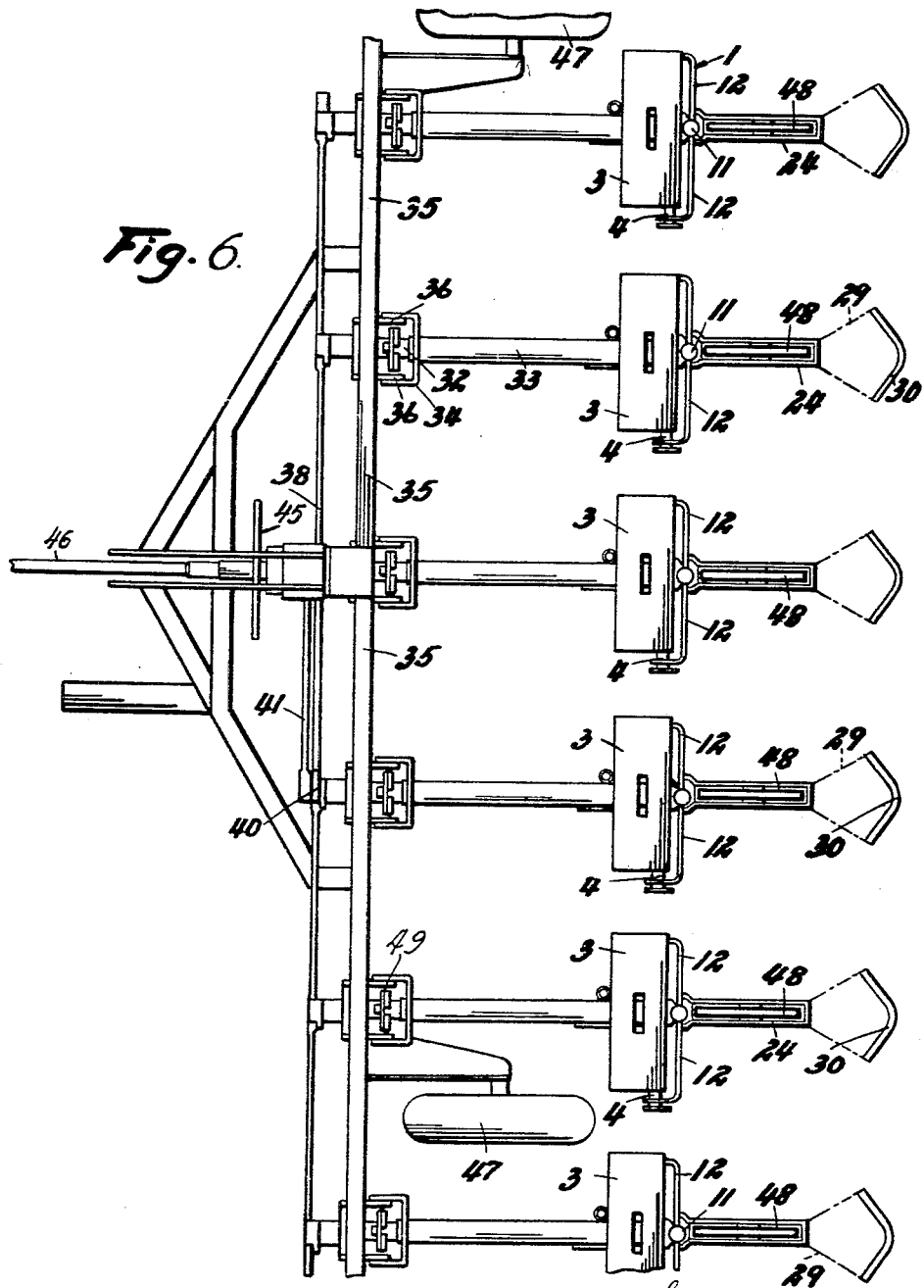

United States Patent Office 2,931,325
Patented Apr. 5, 1960

2,931,325

SOWING IMPLEMENT

John Thelander, Gunnar Leijon, Elwing Westergren, and Sven Akesson, Landskrona, Sweden, assignors to Aktiebolaget Överums Bruk, Overum, Sweden, a Swedish joint-stock company Application July 24, 1956, Serial No. 599,830

Claims priority, application Sweden July 29, 1955

3 Claims. (Cl. 111—34)

When beet seeds are sown by means of drill machines such a surplus of seed is usually deposited in the soil that the plants will grow too closely in the row and therefore must be thinned. In order to reduce this surplus sowing implements for the sowing of single grains of seed have been proposed, but existing implements of this kind have several drawbacks, for instance that the seeds will be damaged or that the feeding device is complicated.

An object of the invention is to provide a seed planter of a simple construction capable of simultaneous sowing of a plurality of rows with single seed grains in a constant depth, which is independent of the varying surface level, and in a constant distance between the sown grains.

Another object of the invention is to provide the planter with sowing implements by means of which the seed to be discharged is protected from such a squeezing or friction which would reduce the fertility of the seed.

A further object of the invention is to provide a simple feeding device for the seed requiring only a little space.

A further object of the invention is to provide a simple driving mechanism for the feeding device.

Other objects and advantages will appear from the following description, reference being made to the accompanying drawing, in which:

Figure 1 is a transverse section of a sowing implement according to one form of the invention;

Figure 2 is a side elevation, partly in section, of Figure 1;

Figures 3 and 4 are plan views of two embodiments of feeding strips;

Figure 5 is a side elevation and Figure 6 a top view of a sowing machine with a plurality of the implements shown in Figures 1–4.

The seed planter has a frame work 35, which is carried by wheels 47, as shown in Figures 5 and 6, has suitable means for the connection of the sowing machine to a tractor, and is, as shown in Figure 6, provided with six sowing implements. Each sowing implement, generally denoted 1, comprises a seed container 3 carried by a share 2 for cutting the furrow, into which the seed is to be drilled. Said container has a sloping front wall 19 connected by a support 20 with the share 2 of the container. Said support 20 is attached to the lower end of an arm 31, which with its upper end is attached to one end of a tube-shaped arm 33. At the fore end the arm 33 is provided with a U-shaped bow 34, and each one of the forwardly directed shanks of the bow of each arm 33 is pivotally connected with lugs 36 in the frame work 35, so that in this manner the arms 33 are individually vertically swingably mounted in the frame work. Each container has a feeding device in the form of a strip 4 of rubber or any other flexible material, which rests with its middle portion 10 upon the bottom 7 of the container. The end portions 9 of the strip extend through by-pass apertures 18 in the side walls of the container and are outside the apertures bent upwards over guide rollers 8 and are connected with two arms 12 extending in opposite directions from a swingable device 11.

Each bottom 7 has a discharge opening 6, and the middle portion of each strip has a series of collecting holes 5 arranged in a row 13 in the transverse vertical plane through the opening 6. By means of the arms 12 a reciprocating motion is imparted to the strips in their longitudinal direction, whereby the strips slide between respectively the bottom and the seed and each hole will collect a grain of seed either during the outward motion or at the turning point. Each time a filled hole passes over a discharge opening a grain of seed will fall down through the discharge opening into the furrow formed by the share, and if the distance between the holes is reduced towards the ends of the row of holes as in the embodiment shown in Fig. 4 the time intervals between the grains successively discharged will provide for equal spacing between the sown grains. In order to improve the equalization during the turning interval a second discharge opening 15 is provided in the bottom at some distance from the row of holes in the strip, and a corresponding additional collecting hole 14 is formed in the strip opposite to each one of the outermost holes in the row 13. Thereby two grains will be discharged simultaneously each time the strip changes the moving direction. For increasing the distance between the two discharged grains a guiding plate 16 is provided at the lower side of the bottom below the opening 15. The holes in the strip and the openings in the bottom may widen downwards to facilitate a rapid discharge, and a special ejector may thus be dispensed with.

A sealing device in the form of a brush 77 covers the holes 5 and 14 as they are moved over the bottom openings 6, 15 so as to prevent more than one grain from dropping simultaneously through the same opening, and the apertures 18 in the side walls are closed by similar brushes 17. From the drawing it is obvious that the seed is subjected to an inconsiderable wear against the bottom 7. The bottom may be made of stainless steel.

A shaft 32 is rotatably journalled within each tube-shaped arm 33, and the rear portion of such a shaft passes through the upper portion of its seed container and carries behind the container the swingable arms 12. The fore end of a shaft is between the shanks of the bow 34 and on line with the pivot of the arm 33 provided with a universal joint 49 and carries a hub 39 with a downwards extending crank arm 37 which at its lower end is connected with a reciprocating coupling bar 38 extending transversely along the frame work and connecting all crank arms 37. One of the hubs 39 has an upright crank arm 40, which is connected with one end of a connecting rod 41 having the other end of the rod connected with a crank pin 42 on a shaft 44 carried in a bearing 43 in the frame work 35. By means of a gear wheel transmission 45 the shaft 44 is in a driving connection with the power take off of a tractor, not shown, for the towing of the machine. Two wings 22 extend rearwards from the body 21 of each share, which wings keep the soil aside from the furrows 23. A wheel 48 between the wings for pressing the seed down into the soil is journalled in a bearing in a rearwards directed bow-shaped arm 24, which is swingably mounted on the share. A hinged bar 26 passes through a coupling bush 27 attached to the arm 24 and presses the same downwards by means of a spring 25 acting between the bush and a nut 28 on the threaded top end of the bar. In this way the wheel is pressed against the ground and the seed with a pressure which may be adjusted by the nut 28 so that the depth of the share may be regulated. A skid 30 is by means of chains 29 attached to each share 21 for filling up the furrows so that the sown seed is covered with a mellow soil.

What we claim is:

1. In a seed planter, a transversely extending framework, a plurality of connecting arms extending backwards from the frame work and being vertically swingable on said framework, a seed container mounted on each one of said arms, a longitudinally movable strip of material located on the bottom of each container transversely to the line of motion of the implement and provided with a row of collecting holes distributed along the strip for receiving single seeds and for delivering the same to at least one discharge opening in the bottom of the container, through which the seeds will drop as the holes pass such an opening, a share device attached to the appending container below each opening for supporting the container and making a furrow for the discharged seed, a sealing device secured to the container above the strip for covering the collecting holes while passing such a discharge opening, said strip having extended flexible end portions passing through apertures in the side walls of the container and being bent upwards over guide members, a driving shaft extending along and being journaled within each connecting arm, a crank mechanism for imparting an oscillating turning motion to the driving shafts, a two-armed lever on the rear end of each driving shaft having the arms connected with said flexible ends of the strip for imparting an oscillating motion strip, and the distances between said holes in the strip being reduced toward the ends of the row of holes for providing for equal spacing between the sown seeds.

2. A seed planter as defined in claim 1, wherein a collecting hole is arranged beside each one of the outermost holes in a row of collecting holes.

3. In a seed planter as defined in claim 1, a number of crank arms journalled in the frame work and connected each to the appending driving shaft by means of a universal joint, and a common coupling bar connecting said crank arms with a crank mechanism for imparting an oscillating motion to the coupling bar.

References Cited in the file of this patent

UNITED STATES PATENTS

| | | |
|---|---|---|
| 238,040 | Gibbs | Feb. 22, 1881 |
| 347,499 | Mulholen | Aug. 17, 1886 |
| 452,803 | Rhodes | May 26, 1891 |
| 513,940 | Kelly | Jan. 30, 1894 |
| 2,140,096 | Thompson | Dec. 13, 1938 |
| 2,265,720 | Daniels | Dec. 9, 1941 |